March 12, 1957 — H. R. SCHELP — 2,784,571
EVAPORATIVE AIR CYCLE COOLER
Filed Feb. 8, 1954
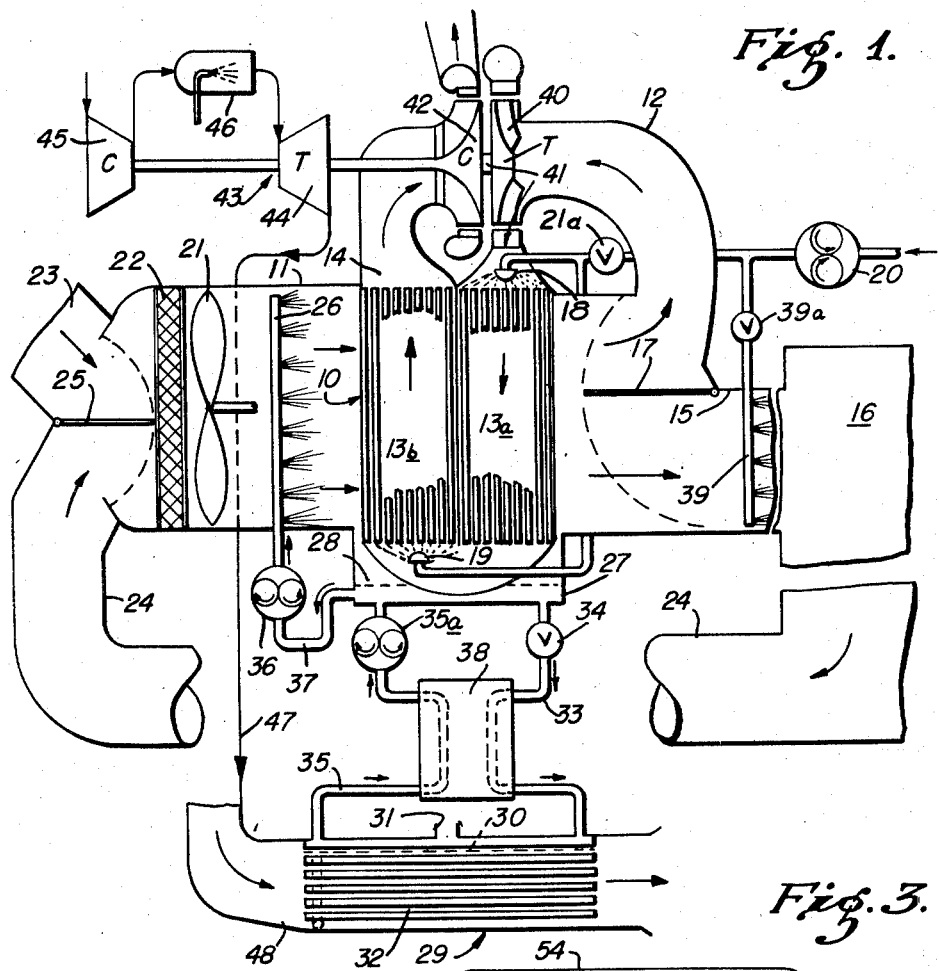
Fig. 1.
Fig. 3.
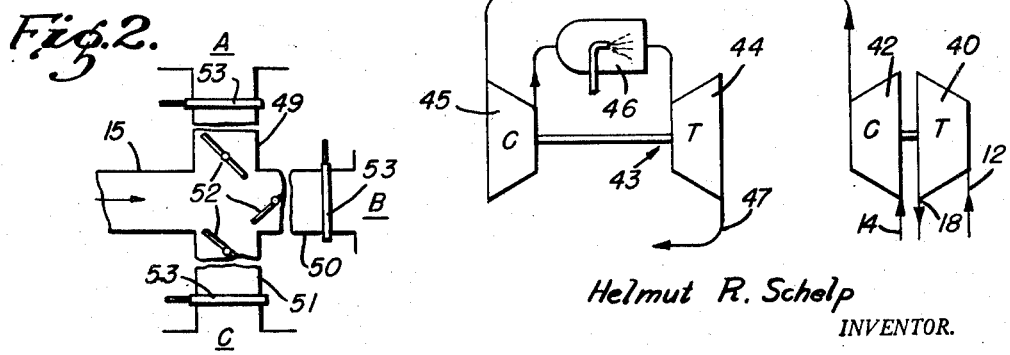
Fig. 2.
Helmut R. Schelp
INVENTOR.
BY
Attorney

United States Patent Office 2,784,571
Patented Mar. 12, 1957

2,784,571

EVAPORATIVE AIR CYCLE COOLER

Helmut R. Schelp, Pacific Palisades, Calif., assignor to The Garrett Corporation, Los Angeles, Calif., a corporation of California Application February 8, 1954, Serial No. 408,929

13 Claims. (Cl. 62—138)

The present invention relates generally to air conditioning apparatus; and is more particularly concerned with air conditioning apparatus and systems of the type employing an evaporative air cycle and utilizing an absorption system.

It is one object of the herein described invention to provide air conditioning apparatus of the type employing an evaporative air cycle in which the various components are so located as to result in optimum performance, and which are so arranged and controlled as to permit the apparatus to control separately the temperature and the humidity of the air to be conditioned.

Another object is to provide an evaporative air cooling apparatus which takes advantage of the heat of evaporation of water in a heat exchanger, yet which is arranged to deliver a flow of conditioned air which may be divided up with one portion being utilized as working air while another portion is conducted to an enclosure which is to be air conditioned.

It is a further object to provide air conditioning apparatus utilizing a liquid absorber which is arranged to be continuously sprayed into the air to be conditioned so as to control the humidity of the air.

Another object is to provide more effective means in air conditioning apparatus for dehumidifying the air to be conditioned, and which entails the utilization of a liquid absorber which may be reactivated by waste energy from a prime mover, such as a gas turbine in which the waste heat may be controlled independently of its power output.

Another object is to provide a unique pneumatic coupling between a prime mover, utilized as a source of waste energy for reactivating a liquid absorber, and means for moving working air in an air conditioning system.

Still another object is to provide air conditioning apparatus which is adapted for utilization in zone conditioning, and which is so arranged as to enable dehumidified air to be delivered to a remote distribution point, from which the air may be selectively distributed through appropriate distribution ducts each of which has flow control and means for introducing moisture into the air to meet different conditioning requirements for each particular zone.

It is also an object to provide an improved method of evaporative cooling which may be carried out with the apparatus of the present invention.

Further objects of the invention will be brought out in the following part of the specification, wherein detailed description is for the purpose of fully disclosing the invention without placing limitations thereon.

Referring to the accompanying drawing, which is for illustrative purposes only:

Fig. 1 is a view diagrammatically illustrating air conditioning apparatus embodying the features of the herein described invention;

Fig. 2 is a fragmentary diagrammatic view illustrating a zone conditioning distribution system with which the conditioning apparatus is adapted to be utilized; and Fig. 3 is a diagrammatic view illustrating a modified arrangement of the air conditioning apparatus.

Referring now to the drawing, the air conditioning apparatus of the present invention is shown in Fig. 1 as comprising an evaporative air cycle system which utilizes a heat exchanger, as illustrated schematically at 10, which may be of the type having separate cross flow paths, one of these paths being arranged to conduct air to be conditioned into heat transfer relation with the other path which is arranged for conducting working air to the heat exchanger.

The air to be conditioned is conducted through the heat exchanger by means of main duct 11, while working air is conducted to the heat exchanger through a supply duct 12 from which the working air may be carried through double passes 13a and 13b of the heat exchanger to a discharge outlet as indicated at 14.

On the discharge side of the heat exchanger, the main duct 11 is divided into separate flow paths, one of which connects with the supply duct 12, and the other with a duct 15 by which conditioned air may be conducted to a point of use, such as a room, enclosure or other space to be air conditioned, and as generally indicated at 16. The air from the heat exchanger is selectively apportionable between these flow-paths by means of a suitable valve or damper 17.

The heat exchanger is arranged to function as an evaporative cooler, and to this end nozzles 18 and 19 are provided for directing a spray of water into the working air at its entrance to the respective passes 13a and 13b. These nozzles are supplied with water through a suitable conduit system which may be supplied from a suitable pump 20, the supply being controlled by a conventional valve 21a. The water introduced into the working air forms a fine mist and provides intimate contact of air and water which results in cooling of the air by evaporation. By utilizing this method of cooling, additional advantage is taken of the increased heat transfer on wet surfaces in the heat exchanger. Any suitable means may be provided for moving the conditioning air through the main duct, heat exchanger, and thence to the enclosure. For such purpose, a fan 21 is shown as being mounted on the inlet side to the heat exchanger. This fan is driven from suitable power means (not shown), and it is preferred to individually drive this fan by its own separate power means, since this will permit its being utilized for air circulation only, even at such times when it may not be desired to utilize evaporative cooling in the heat exchanger.

The system as thus far described forms the basic cooler of the present invention and provides a cooler of the evaporative type which is simple of construction and which will meet many requirements for economical installation.

A filter 22 of conventional construction is shown as being installed ahead of the fan 21 for the removal of dust and other particles from the main air supply. The main air supply is arranged to take in ambient air, as through a duct 23 and to recirculate a portion of the air from the enclosure 16 through a recirculation duct 24. The air may be selectively taken from either of the ducts 23 and 24, or proportionally from both, by varying the position of a valve or damper 25.

The efficiency and versatility of the apparatus is increased by providing means for removing moisture from the air to be conditioned as it passes through the heat exchanger. This is illustrated as being accomplished by providing a spray tube 26 or other suitable means at the entrance for the air to be conditioned to the heat exchanger by which a suitable liquid absorber may be sprayed into the air. A number of liquid absorbers are suitable for this purpose, for example, lithium chloride, lithium bromide, and any of the liquids in the glycol family. The liquid absorber with entrained moisture from the air is collected in a sump 27 which may constitute a part of the construction of the heater exchanger, the accumulated liquid being shown therein at a level as indicated by the numeral 28. Provision is made for circulating a portion of the collected liquid from the sump 27 through a suitable concentrator 29 which may be in the form of a boiler in which the liquid is shown as being at a level 30. The compartment containing the liquid is vented to atmosphere as indicated at 31, and is in heat exchange relation with a heated medium circulated through tubes 32. The concentrator may assume various constructions, and in the present instance the illustrated boiler is only exemplary. The heating medium may be supplied from any suitable source, or as a waste product, as will hereinafter be more fully explained.

The sump 27 is connected to a conduit 33 by which the liquid from the sump may be supplied to the concentrator, a suitable valve 34 being provided to control the liquid flow therethrough. A return conduit 35 including a suitable pump 35a for the reactivated absorber connects the concentrator with the sump. By means of a conduit 37 connected to the sump and a suitable pump 36 a certain amount of the reactivated absorber may be supplied under pressure to the spray tube 26 directly from the sump 27.

It will be appreciated that the liquid 28 conducted from the sump 27 through the conduit 33 is relatively cold, while the reactivated absorber which is conducted from the concentrator through conduct 35 is relatively hot. The thermal efficiency of the absorber system is increased by bringing the liquid flowing in conduit 33 into heat transfer relation with the liquid flowing in conduit 35, this being done by means of a suitable heat exchanger 38.

With the introduction of liquid absorber into the air to be conditioned in the heat exchanger 10, the air which is discharged therefrom will be dry or dehumidified. This dry air may be conducted directly to the point of use and utilized under operating conditions where it is desired to have dry air. However, under certain conditions, it may be advisable to re-evaporate water into the dried air. For this purpose, a spray tube 39 is installed in the duct 15 downstream from the heat exchanger 10. The spray tube is connected through a suitable control valve 39a to a water supply source which may be the same as that supplying the nozzles 18 and 19 from the pump 20. With this arrangement, the system becomes very versatile with respect to the control of moisture content in the air which is furnished to the point of use or enclosure.

Where greater cooling capacity may be required over that which may be provided by evaporation in the heat exchanger, as in large industrial installations, the cooling capacity may be increased by placing means in the working air path ahead of the heat exchanger which will cause expansion and cooling of the air prior to cooling by the evaporation of water in the heat exchanger. For this purpose, an expansion turbine 40 is provided, the inlet of the turbine being connected to receive air from the supply duct 12, and the outlet from this turbine being connected to discharge air into the entrance to the heat exchanger pass 13a. This expansion turbine is connected through a driving shaft 41 with an air compressor 42 having its inlet connected with the discharge from heat exchanger pass 13b, and its outlet discharging to atmosphere.

With this arrangement, power developed in the expansion turbine 40 is utilized for driving the compressor 42. In addition, the shaft 41 is shown as being extended and connected to a suitable main source of power 43 which in this case is shown as comprising a gas turbine 44 and a compressor 45, both being connected through the shaft 41. The compressor 45 delivers compressed air to a combustion chamber 46 to provide a hot gas supplied to the gas turbine 44 for driving the same. Thus the prime mover 43 assists in driving the expansion turbine 40 and the compressor 42. Other types of prime movers may be utilized, but they are not adapted in general to furnish a sufficient amount of waste energy, which is contemplated in the present invention as being utilized to reactivate the liquid absorber used for dehydrating the air to be conditioned passing through the heat exchanger.

A gas turbine with its relatively low efficiency provides a greater supply of waste heat than would be obtainable from conventional internal combustion engines, and thus assures enough waste heat to permit the system to operate, such waste heat being controllable independently of the power output of the prime mover. Waste heat from the gas turbine is conducted through a duct 47, shown schematically, to an inlet connection 48 of the concentrator 29, this waste heat thus being utilized for reactivating the liquid absorber. It will therefore be apparent that the proposed arrangement provides an efficiently operating system by which the air to be conditioned may be dehydrated. Since dry air is utilized in the expansion turbine 40, only a small pressure ratio is required across the expansion turbine in order to secure a desired temperature decrease. Operational advantages are therefore obtained as compared to arrangements wherein the expansion device operates on air containing moisture.

The air conditioning system of the invention may be readily adapted for seasonal use such as "winter" or "summer" operation. For example, during the winter, it may be desired to simply circulate air which has been conditioned as to humidity or moisture content, whereas during the summer, it may be desirable to have the additional cooling which may be obtained in the evaporative cooler heat exchanger.

The present invention is also susceptible of use for zone conditioning, since the conditioning air is dry being indirectly cooled by the evaporative process and dehumidified by the liquid absorber. In the case of zone cooling, as shown in Fig. 2, the duct 15 is connected with individual distributing ducts, for example, ducts 49, 50, and 51 which are arranged to respectively distribute air to points of use as indicated at A, B and C which may be different rooms or enclosures. Each of these ducts is provided with a control damper 52 by which flow to the particular point of use may be varied. Moreover, individually controlled spray devices 53 are provided for each point of use whereby the conditioning air may be varied as to humidity, and temperature, as desired. Thus, by transmitting dry air to the points of distribution, and providing means for evaporative cooling by the introduction of moisture at these points, it is possible to control the temperature and humidity to meet desired requirements.

Referring now to Fig. 3, a modified arrangement is shown in which the source of power 43 is pneumatically, instead of mechanically, coupled with the expansion turbine 40 and its associated compressor 42. Instead of utilizing the extended shaft 41, the pneumatic coupling is accomplished by connecting the discharge of compressor 42, as by a duct 54, with the inlet of compressor 45. Hence, the pumping action of the compressor 45 of the gas turbine unit acts through its suction effect to pneumatically, rather than mechanically as in Fig. 1, to reduce the driven load on the expansion turbine 40.

The modified arrangement, as just described, provides increased flexibility in the operation of the apparatus. The gas turbine 44 may be operated at a speed different from that of the expansion turbine 40. As a consequence, the gas turbine may be controlled more readily in relation to the waste heat required for reactivating the liquid absorber.

Various modifications may suggest themselves to those skilled in the art without departing from the spirit of my invention, and, hence, I do not wish to be restricted to the specific form shown or uses mentioned, except to the extent indicated in the appended claims.

I claim:

1. An air conditioning system, comprising: air expansion means including an air inlet for working air and an air outlet to discharge said working air at a reduced pressure and temperature; a heat exchanger connected to said air outlet and providing a path for said working air after leaving said expansion means; nozzle means for introducing a spray of water into the working air after it has passed through said expansion means for evaporative cooling of said air during its flow through said heat exchanger; air moving means including an air inlet for the working air leaving said heat exchanger and an air discharge outlet; power means having a driving connection with said air moving means; duct means to conduct air to be conditioned through said heat exchanger along a path separate from the working air path but in heat exchange relation with respect thereto; means for introducing a liquid absorber into said air to be conditioned so as to remove moisture therefrom; and means utilizing waste energy from said power means for reactivating said absorber.

2. An air conditioning system, comprising: air expansion means including an air inlet for working air and an air outlet to discharge said working air at a reduced pressure and temperature; a heat exchanger connected to said air outlet and providing a path for said working air after leaving said expansion means; nozzle means for introducing a spray of water into the working air after it has passed through said expansion means for evaporative cooling of said air during its flow through said heat exchanger; air moving means including an air inlet for the working air leaving said heat exchanger and an air discharge outlet; a gas turbine having a driving connection with said air moving means; duct means to conduct air to be conditioned through said heat exchanger along a path separate from the working air path but in heat exchange relation with respect thereto; means for introducing a liquid absorber into said air to be conditioned so as to remove moisture from said air to be conditioned; and means utilizing waste heat from said gas turbine for reactivating said absorber.

3. An air conditioning system, comprising: an expansion turbine including an air inlet for working air and an air outlet to discharge said working air at a reduced pressure and temperature; a heat exchanger connected to said air outlet and providing a path for said working air after leaving said expansion turbine; nozzle means for introducing a spray of water into the working air after it has passed through said expansion turbine of evaporative cooling of said air during its flow through said heat exchanger; air moving means including an air inlet for the working air leaving said heat exchanger and an air discharge outlet; a gas turbine having a driving connection with said air moving means; duct means to conduct air to be conditioned through said heat exchanger along a path separate from the working air path but in heat exchange relation with respect thereto; means for introducing a liquid absorber into said air to be conditioned so as to remove moisture from said air to be conditioned; and means utilizing waste heat from said gas turbine for reactivating said absorber.

4. An air conditioning system, comprising: an expansion turbine including an air inlet for working air and an air outlet to discharge said working air at a reduced pressure and temperature; a heat exchanger connected to said air outlet and providing a path for said working air after leaving said expansion turbine; nozzle means for introducing a spray of water into the working air after it has passed through said expansion turbine for evaporative cooling of said air during its flow through said heat exchanger; air moving means including an air inlet for the working air leaving said heat exchanger and an air discharge outlet; a hot gas turbine; driving connections between said turbines and said air moving means; duct means to conduct air to be conditioned through said heat exchanger along a path separate from the working air path but in heat exchange relation with respect thereto; means for introducing a liquid absorber into said air to be conditioned so as to remove moisture therefrom; and means utilizing waste heat from said gas turbine for reactivating said absorber.

5. A gas conditioning system, comprising: a heat exchanger having separate flow paths in heat exchange relation; means for supplying a gas to be conditioned to one of said paths; moisture absorbing means for dehumidifying said gas entering said heat exchanger; means for diverting a portion of the dehumidified gas through the other path of said heat exchanger as a working gas; means for directing a spray of water into said working gas to cause evaporative cooling thereof; means for moving said working gas through said heat exchanger including a gas turbine power device; and means heated by exhaust discharge from said turbine for reactivating said moisture absorbing means.

6. A gas conditioning system, comprising: a heat exchanger having separate flow paths in heat exchange relation; means for supplying a gas to be conditioned to one of said paths; moisture absorbing means for dehumidifying said gas entering said heat exchanger; means for diverting a portion of the dehumidified gas through the other path of said heat exchanger as a working gas; means for directing a spray of water into said working gas to cause evaporative cooling thereof; means for directing a controlled spray of water into the remaining portion of dehumidified gas from said heat exchanger to vary its moisture content; means for moving said working gas through said heat exchanger including a gas turbine power device; and means heated by exhaust discharge from said turbine for reactivating said moisture absorbing means.

7. In an air conditioning system: an evaporative heat exchanger having a path for conducting a main flow of air to be conditioned into heat transfer relation, but out of contact with coolant air containing an evaporative liquid; nozzle means for spraying a liquid absorber into the main flow of air entering said heat exchanger; a sump for collecting said absorber and entrained moisture as a liquid, whereby de-humidified main air leaves said heat exchanger; and means for reactivating liquid from said sump and returning it to said nozzle means.

8. In an air conditioning system: an evaporative cooler having a flow-path for conducting air to be conditioned into heat transfer relation with a coolant; means for directing a spray of liquid absorber into the air entering said cooler; means for conducting dehumidified air from said cooler to a plurality of zone distribution ducts; and means for injecting water into the air flow in each of said distribution ducts.

9. Apparatus for conditioning air for an enclosure, comprising: an evaporative cooler having a flow-path for conducting a main air stream into heat transfer relation with an evaporatively cooled working air flow-path; means for treating the main stream of air entering said cooler with a moisture absorbant; a pair of branch ducts having a common connection adapted to receive the dehumidified main air stream discharged from said cooler, one of said ducts being connected to said working air path for supplying working air from the main air stream, and the other of said ducts being connected to the enclosure to be air conditioned; means for injecting a controlled spray of water into the air in the other of said ducts; and means for selectively controlling flow through said ducts.

10. The method of cooling a gas, which comprises the steps of: moving the gas through a main flow path into heat transfer relation with a separate flow path; directing a liquid absorber into the gas so as to dehumidify the gas while in heat transfer relation with the separate flow path; diverting a portion of the dehumidified gas from the main flow-path, cooling said portion, and passing it through said separate flow path; and directing a spray of water into the diverted portion of said gas so as to cause evaporative cooling thereof while in said separate flow path.

11. The method of cooling a gas, which comprises the steps of: moving the gas through a main flow path into heat transfer relation with a separate flow path; directing a liquid absorber into the gas so as to dehumidify the gas while in heat transfer relation with the separate flow path; diverting a portion of the dehumidified gas from the main flow-path, cooling said portion, and passing it through said separate flow path; conducting non-diverted de-humidified gas to a plurality of zone distribution points; and injecting moisture into the gas for each zone in accordance with its conditioning requirements.

12. A gas conditioning system, comprising: a heat exchanger having separate flow paths in heat exchange relation; means for supplying a gas to be conditioned to one of said paths; moisture absorbing means for dehumidifying said gas entering said heat exchanger; means for conducting a working gas through the other path of said heat exchanger; means for moving said working gas through said other path; a gas turbine power device; means pneumatically coupling said gas moving means and said power device; and means heated by exhaust moisture absorbing means.

13. A gas conditioning system, comprising: a heat exchanger having separate flow paths in heat exchange relation; means for supplying a gas to be conditioned to one of said paths; moisture absorbing means for dehumidifying said gas entering said heat exchanger; means for conducting a working gas through the other path of said heat exchanger; means for moving said working gas through said other path including a pump having an inlet connected to receive discharge working gas from said other path, and an outlet; a gas turbine power device including a connected compressor having an inlet, and an outlet connected to furnish combustion gas to said gas turbine; a duct connecting said pump outlet and said compressor inlet, and means heated by exhaust discharge from said gas turbine for reactivating said moisture absorbing means.

References Cited in the file of this patent
UNITED STATES PATENTS

| | | |
|---|---|---|
| 2,114,787 | Smith | Apr. 19, 1938 |
| 2,133,334 | Rosett | Oct. 18, 1938 |
| 2,147,248 | Fleisher | Feb. 14, 1939 |
| 2,175,469 | Kaufman | Oct. 10, 1939 |
| 2,176,645 | Smith | Oct. 17, 1939 |
| 2,256,940 | Crawford | Sept. 23, 1941 |
| 2,477,932 | King | Aug. 2, 1949 |